United States Patent
Nicolai et al.

(10) Patent No.: US 6,791,027 B1
(45) Date of Patent: Sep. 14, 2004

(54) COMPONENT KIT FOR A SWITCH CABINET

(75) Inventors: Walter Nicolai, Buseck (DE); Rolf Benner, Herborn (DE); Horst Besserer, Herborn (DE); Marc Hartel, Reiskirchen (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 09/622,110

(22) PCT Filed: Mar. 13, 1999

(86) PCT No.: PCT/EP99/01666
§ 371 (c)(1),
(2), (4) Date: Aug. 11, 2000

(87) PCT Pub. No.: WO99/48178
PCT Pub. Date: Sep. 23, 1999

(30) Foreign Application Priority Data

Mar. 18, 1998 (DE) .......................................... 198 11 714

(51) Int. Cl.[7] ................................................. G02B 6/00
(52) U.S. Cl. ........................ 174/50; 174/17 R; 174/58; 174/60; 361/695; 312/265.6; 220/4.31

(58) Field of Search .................................. 174/50, 17 R, 174/58, 60; 361/695; 312/223.6, 265.6, 265.4; 220/4.31, 4.02, 4.28, 4.33

(56) References Cited

U.S. PATENT DOCUMENTS

| | | | |
|---|---|---|---|
| 4,461,519 A | | 7/1984 | Hildebrandt et al. |
| 5,806,945 A | * | 9/1998 | Anderson et al. ......... 312/265.3 |
| 5,890,783 A | * | 4/1999 | Babcock et al. ......... 312/265.3 |
| 6,089,393 A | * | 7/2000 | Revelli et al. ............. 220/4.31 |
| 6,515,227 B1 | * | 2/2003 | Massey et al. ................ 174/50 |
| 6,657,861 B2 | * | 12/2003 | Irmer ......................... 361/695 |

FOREIGN PATENT DOCUMENTS

| | | |
|---|---|---|
| DE | 43 41 943 | 5/1993 |
| DE | 44 39 622 | 11/1995 |

* cited by examiner

Primary Examiner—Dhiru R Patel
(74) Attorney, Agent, or Firm—Pauley Petersen & Erickson

(57) ABSTRACT

A component kit for a switch cabinet, having a frame whose open sides can be clad with elements and at least one cabinet door. To be able to vary the installation space available in the switch cabinet, it is possible to fix different wall elements and/or cabinet doors to the faame, which have different depths extending perpendicular to the corresponding sides of the frame.

13 Claims, 4 Drawing Sheets

COMPONENT KIT FOR A SWITCH CABINET

BACKGROUND OF THE INVENTION

1. Field of the Invention

This invention relates to a kit for a switchgear cabinet with a rack, with open sides that can be covered by wall elements and at least one cabinet door.

2. Description of Related Art

A switchgear cabinet is known from German Patent Reference DE 44 39 622 C1, wherein the rack is assembled from twelve identical profiled frame three wall elements, a cover and a cabinet door. Threaded receivers are cut into the vertical profiled frame sections and the corner connectors for attaching the wall elements, with which the screw receptacles of the wall elements can be arranged flush. Fastening screws are passed through the screw receptacles and screwed into the threaded receivers.

The available installation space for housing electrical built-ins is fixed in such switchgear cabinets. Therefore later additions cause problems, if the switchgear cabinet is tightly packed.

SUMMARY OF THE INVENTION

It is one object of this invention to provide a kit for a switchgear cabinet of the type mentioned above, wherein additional installation space is made available in a simple manner.

This object is achieved with different wall elements and/or cabinet doors, which have different installation depths extending in a direction vertically relative to the respective sides of the rack, and can be selectively attached to the rack.

A kit in accordance with this invention makes it possible to vary the volume of the interior of the switchgear cabinet. During this, one or several sides of the rack can be selectively expanded as a function of the desired fittings. The available volume of the switchgear cabinet in particular can be changed in the direction of its width and depth.

In one preferred embodiment of this invention, at least one of the wall elements has a bulge facing away from the switchgear cabinet interior, which is designed as a cable receptacle and to which cables can be conducted via cable passages of the wall element The cable passages are cut into the wall element in the area assigned to the bottom and/or the top of the switchgear cabinet It is thus possible to conduct cables from the bottom or the top into the cable receptacle. The cables can be housed in an ordered manner and then can branch off to the desired locations in the interior of the switchgear cabinet.

In this case, the cable passages of the wall element can be closed by removable inserts or covers, so that they can be selectively made accessible when needed.

In order to perform a simple mounting of the wall elements, they can be suspended from a pivot bearing with a horizontal pivot axis. The wall elements can be pivoted into an upright mounting position, and in this mounting position the wall elements can be fixed in place on the rack by at least one fastening element. With this arrangement the attachment of the wall element can be performed by a single installer. Quick-action clamping devices are preferably used as fastening elements.

A kit in accordance with this invention is distinguished, for example, because the wall elements have a flat wall, which has angled-off sections on its vertical edges. The angled-off sections of the various wall elements have different lengths in the direction vertically relative to the associated side of the rack. It is possible to realize simply designed wall elements with this step, which can be produced with a small outlay in parts.

If the rack has four vertical profiled frame sections forming the sides of the rack, and the wall elements respectively rest with angled-off sections against the sides of two adjoining vertical profiled frame sections facing each other, then the wall elements can be easily inserted into the openings in the rack and can therein be fastened.

Similar to the wall elements, the cabinet doors can also have a flat door leaf which has a circumferential angled-off section on its edges. Here, the angled-off sections of different cabinet doors have different structural depths.

For example, one of the available cabinet doors can have an observation window in the door leaf.

BRIEF DESCRIPTION OF THE DRAWINGS

This invention will be explained in greater detail by an exemplary embodiment represented in the drawings wherein.

DESCRIPTION OF PREFERRED EMBODIMENTS

Figure 1:
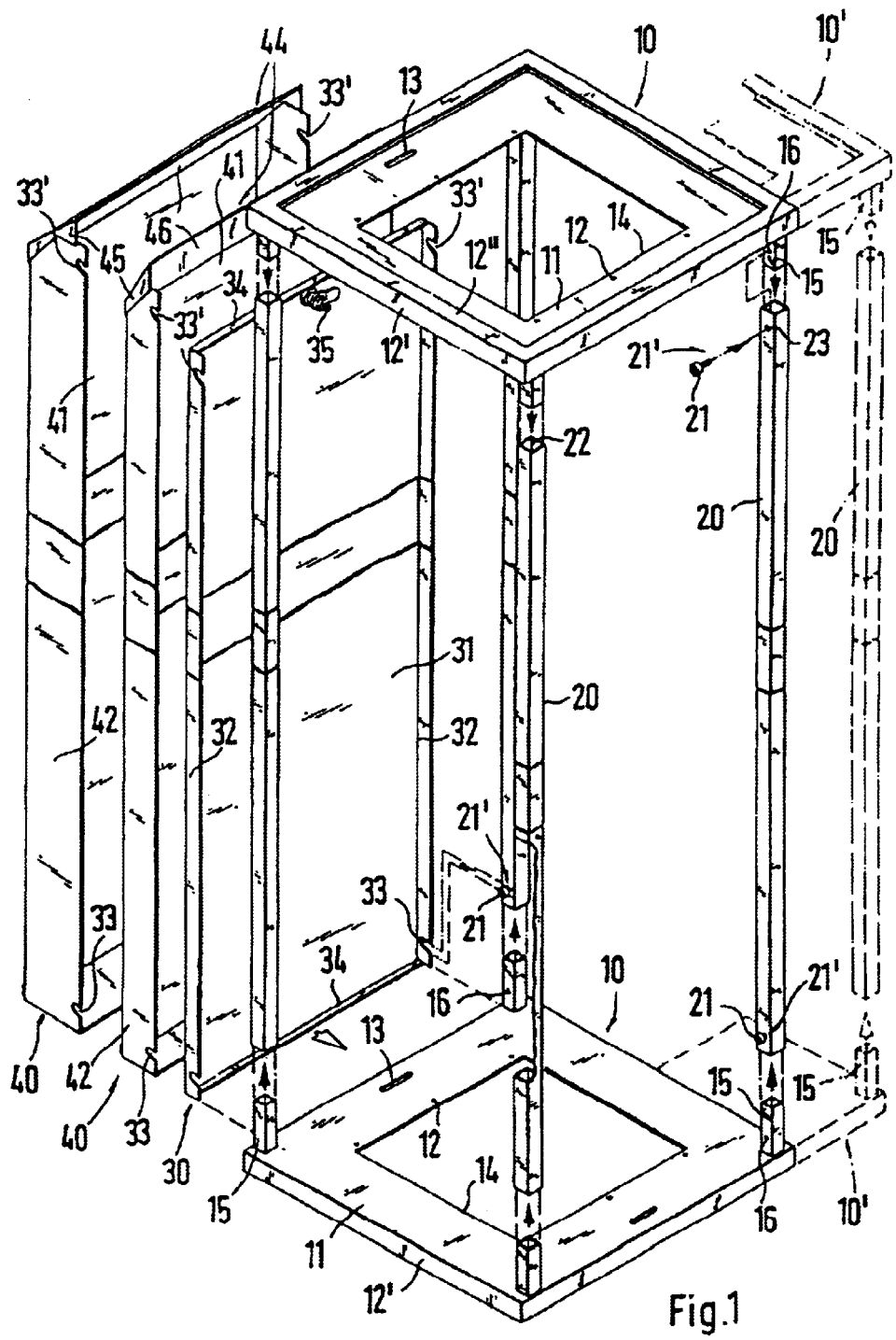
FIG. 1 is a rack of a switchgear cabinet, to which different wall elements can be selectively attached, in a perspective exploded view.

A rack for a switchgear cabinet is shown in FIG. 1, which has a lower and an upper base unit 10. The base unit 10 is made from a flat sheet steel blank and has a horizontally oriented bottom 11, which has angled-off edges 12' on its sides. The edges 12' transition into angled-off sections 12", which are oriented parallel with respect to the bottom 11. Plug-in projections 15 are arranged in the corner areas of the bottom 11 and can be either screwed or welded to the base unit 10. The plug-in projections 15 have a threaded receiver 16 which faces the interior of the switchgear cabinet. Vertical profiled frame sections 20 can be pushed on the plug-in projections 15. In this case, the vertical profiled frame sections 20 are designed as hollow square profiled sections, whose interior cross section approximately corresponds to the exterior cross section of the plug-in projection 15. When the vertical profiled frame sections 20 are pushed on the plug-in projections 15, the screw receptacles 23 of the vertical profiled frame sections 20 are aligned with the threaded receivers 17 of the plug-in projections 15. Fastening screws 21' can be inserted into the screw receptacles 23 and screwed into the threaded receivers 16. In this way, the vertical profiled frame sections 20 are fixedly connected with the base unit 10 to form the rack. The use of base units 10, 10' of different widths is shown by a dashed representation in FIG. 1. The vertical profiled frame sections 20 remain unchanged when using the different base units 10, 10'.

The open sides of the rack can be covered by means of wall elements 30, 40, and by a door, not shown in the drawing. It is indicated in FIG. 1 that different wall elements 30, 40 can be selectively installed on the rack The wall element 30 can be used for example. The wall element 30 has a flat, vertically oriented wall 31, which has angled-off sections 32, 34 on its edges. The angled-off sections 32, 34 point in the direction toward the interior of the rack. The two vertical angled-off sections 32 have slit-shaped hinge bolt receivers 33. In this case the hinge bolt receivers 33 are cut, facing obliquely upward, into the angled-off sections 32. They have an opened slit end, with which they can be pushed on the screw head of the fastening screw 21'. The screw head of the fastening screw 21' is used as a hinge bolt 21. The wall element 30 can be pushed on the hinge bolt 21 with its hinge bolt receivers 33, so that pivoted seating with a horizontally oriented pivot axis is created. In the process, the wall element 30 can be maintained at an angle with respect to the associated side of the rack without slipping off the hinge bolt 21. This is made possible by the obliquely cut-in hinge bolt receivers 33. A fastening element 35, embodied as a lock, fixes the wall element 30 in place. The wall element 30 strikes against the two upper fastening screws 21 in the tilted-in pivot position. For this purpose the angled-off sections 32 have notches 33', which form the stops. The lock 35 can be rotated in the mounting position, so that a tongue-shaped locking element of the lock can engage a slit-shaped locking receiver 13 of the upper base unit 10.

A wall element 40, which has a bulge facing away from the interior of the rack, can also be built on the rack in place of the wall element 30. The bulge is used as a cable conduit. Here, the bulge is formed by a lateral wall 41 and the angled-off sections 42 are connected therewith. In contrast to the angled-off sections 32, 34 of the wall element 30, the angled-off sections 42 of the wall element 40 have a greater structural depth The wall element 40 is open in the upper portion facing the base unit and can be closed by a cover 44. The cover 44 has an upper sheet metal cover plate 46, which is adjoined by downward-oriented lateral elements 45. The lateral elements 45 extend over the angled-off sections 42, so that the sheet metal cover plate 46 strikes with its underside against the angled-off sections 42. The angled-off sections 42 are beveled in this area, so that the sheet metal cover plate 46 is also arranged at an angle with respect to the horizontal line. This allows an improved water run-off. Two wall elements 40 are shown in FIG. 1, which can be selectively installed on the rack. These two wall elements 40 have different structural depths. It is thus possible to make manipulation areas of different size for cables available, depending on the needs of the user. The attachment of the wall 40 takes place in the same way as the fastening of the wall element 30. Initially they are placed with hinge bolt receivers 33 on the hinge bolts 21. Thereafter, the wall elements 40 can be moved into the upright position and fixed in place on the rack by means of fastening elements. The angled-off sections 42 have notches 33' which are used as stops. If the switchgear cabinet is placed into an interior which is protected against moisture, the cover 44 can be removed. Cables can be inserted into the cable conduit of the wall 40 via the cover 44. The introduced cables can then branch off into the interior of the switchgear cabinet The cables can also be introduced through an opening 14 enclosed by the base units 10, 10'. The opening 14 can be closed off by cover plates fastened on fastening receivers 12 arranged around the opening 14. Cable passages can also be screwed to the fastening receivers 12.

Figure 2:
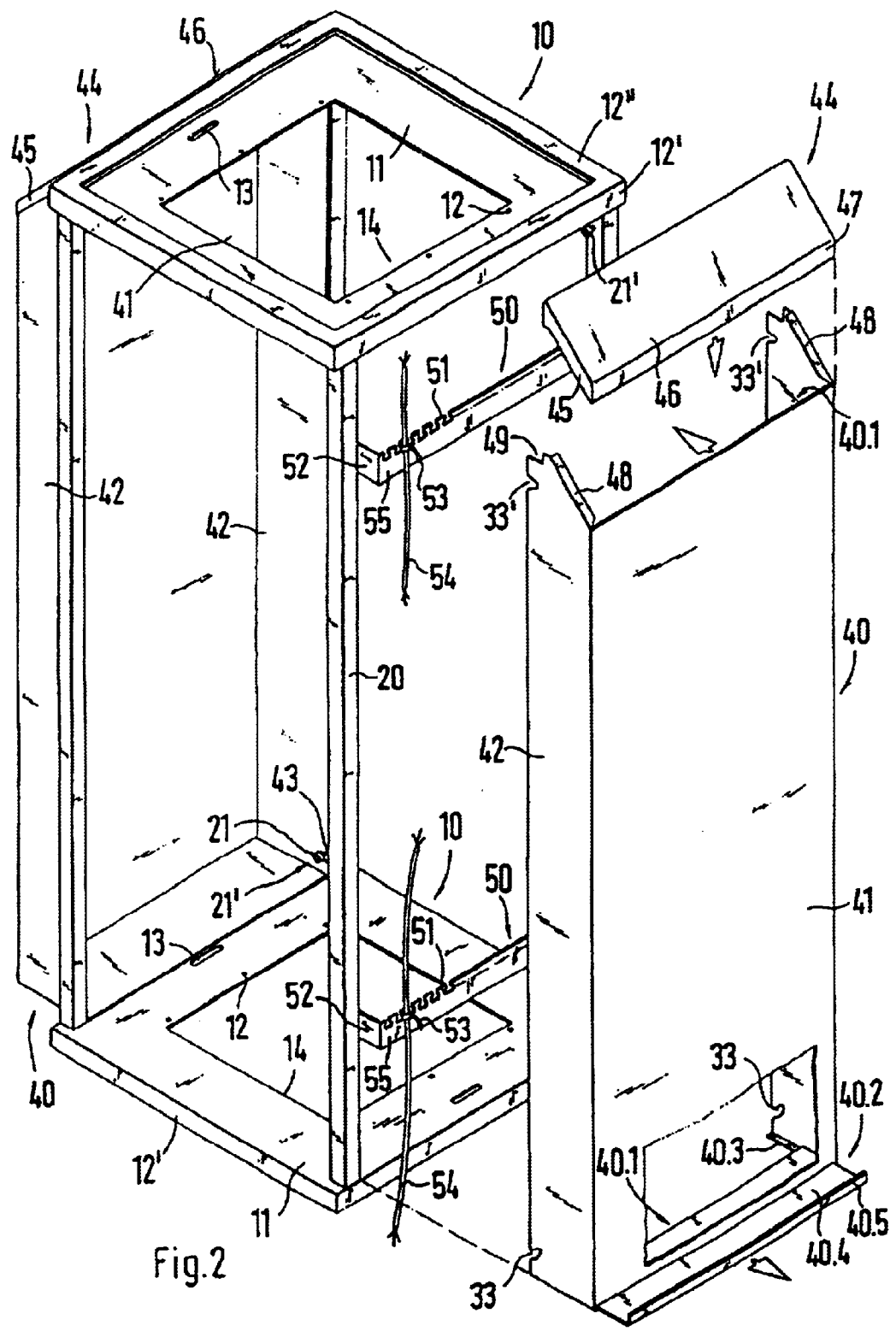
FIG. 2 is the rack shown in FIG. 1, together with two wall elements in a perspective exploded view.

The use of two walls 40, which enclose a cable conduit, is shown in FIG. 2. As shown, cable clamps 50 can be fastened on the vertical profiled frame sections 20. The cable clamps 50 have two legs 52, which are parallel with each other and can be screwed on the inside to the vertical profiled frame sections 20. The two legs 52 project into the cable space enclosed by the wall element 40 and have a holding section 55. A plurality of tongues 51 are cut free from the holding section 55. Cables 54 can be fastened on the tongues 51 by means of cable binders 53. As shown in FIG. 2, the angled-off sections 42 of the wall element 40 have notches 49 in their upper areas. The respective angled-off section 42 extends around the upper base unit 10 with the notches 49, so that the sheet metal cover plate 46 of the cover 44 can make a flush transition into the top of the base unit 10. Adjoining the notches 49, support sections 48, on which the cover 44 rests, are angled off from the angled-off sections 42. When the cover 44 is put down, the lateral elements 45 extend over the angled-off sections 42. An edge 47, which is bent off the sheet metal cover plate 46, extends over the wall 41.

In order to lead cables out of the floor into the cable conduit enclosed by the wall element 40, inserts 40.2 are used with the wall elements 40. Such an insert 40.2 has a horizontal cover plate 40.4, from which a handle 40.5 is bent off in one piece. The cover plate 40.4 can be pushed through an opening of the wall 42. Guides 40.3 are angled off the angled-off sections 42. The cover plate 40.4 can slide on the guides 40.3. The insertion movement of the insert 40.2 into the wall element 40 is limited by the handle 40.5 which strikes against the wall 41. With the insert 40.2 pulled out, a cable passage 40.1 is opened, through which the cables 54 can be introduced into tie cable conduit of the wall element 40.

Figure 3:
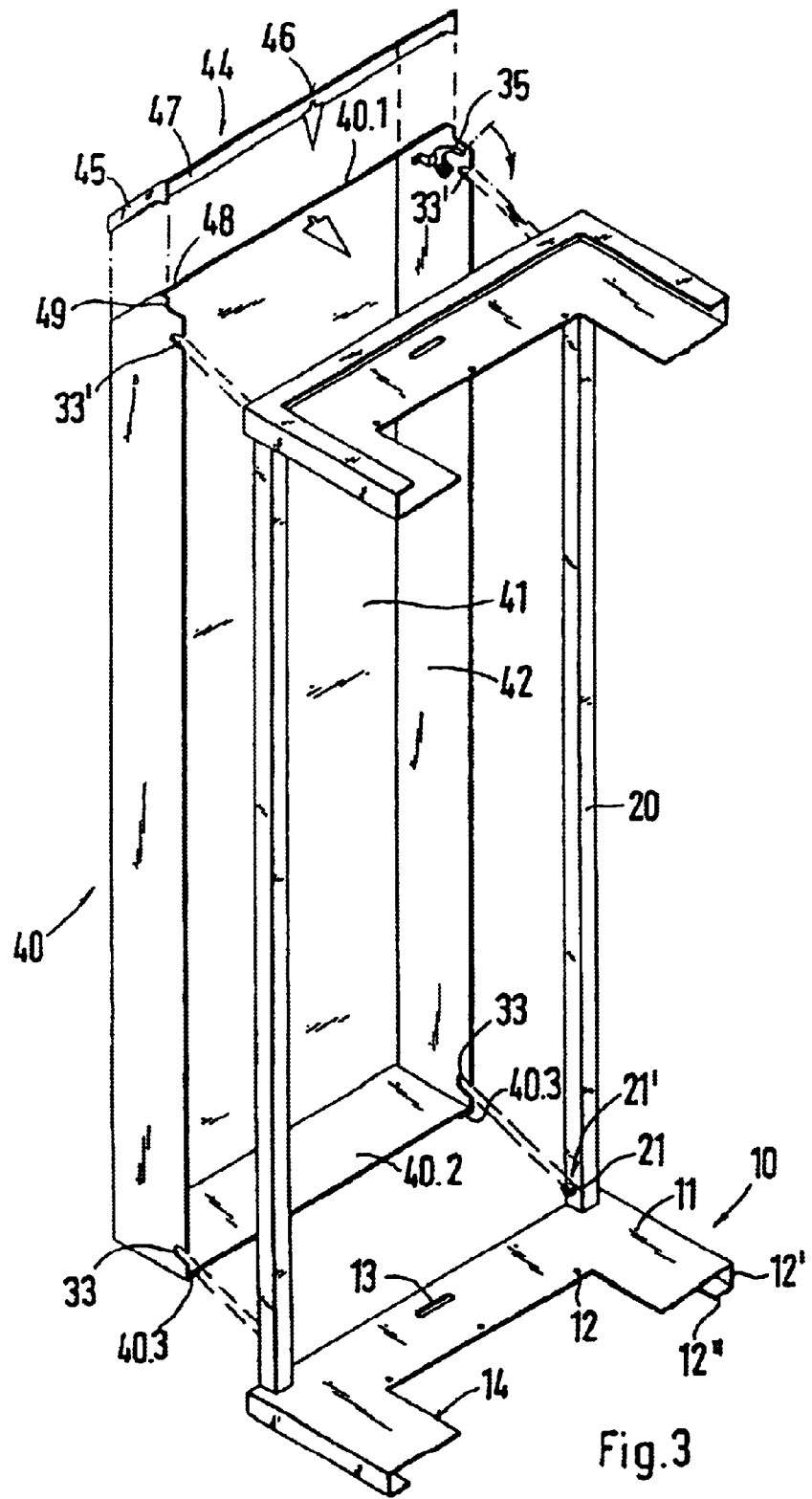
FIG. 3 is the rack shown in FIGS. 1 and 2, in a partial perspective exploded view, with a built-on wall element.

The action for fastening a wall element 40 on the rack is shown in greater detail in FIG. 3. The wall element 40 can be placed with its slit-shaped hinge bolt receivers 33 on the hinge bolts 21 and thereafter be brought into the vertical mounting position. Final fastening of the wall element 40 takes place by means of two fastening elements 35. The fastening elements 35 have locking hooks, which can be pivoted around an axis of rotation extending vertically with respect to the angled-off sections 42. A handle is connected with the locking hooks.

Once the wall element 40 is brought into its mounting position, the locking hook can be pivoted by means of the handle.

The locking hook then extends behind the fastening screw 21' received in the notch 33' and clamps it. To prevent unauthorized access, the fastening element 35 can only be actuated from the interior of the switchgear cabinet.

Fastening elements 35 are attached to both angled-off sections 42 of the wall element 40 for assured fixation.

Figure 4:
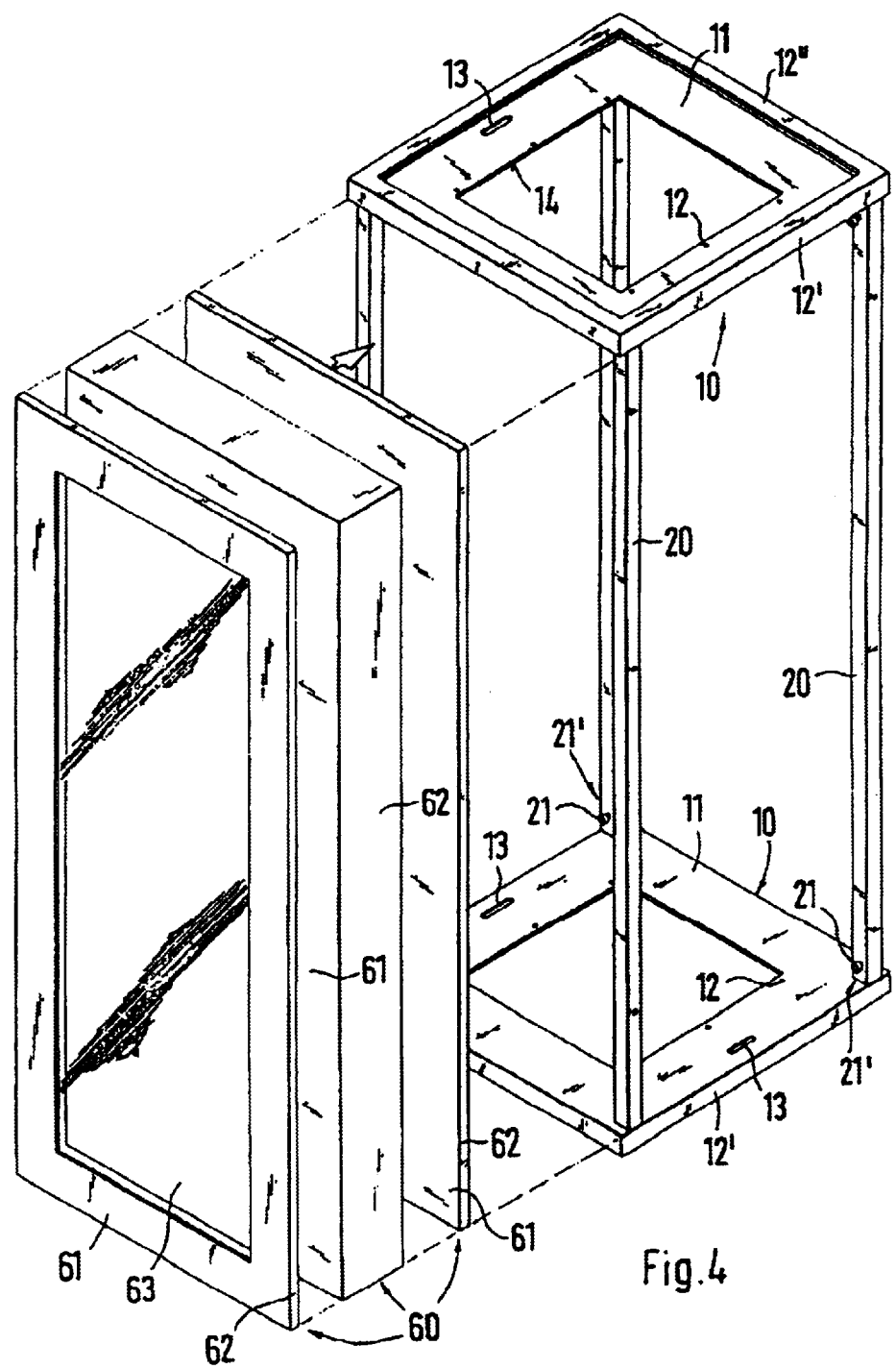
FIG. 4 is the rack shown in FIGS. 1 and 2, in a perspective exploded view, with three different cabinet doors.

The use of three different cabinet doors is shown in FIG. 4.

The cabinet doors 60 have a flat door leaf 61, which has a circumferential angled-off section 62 on its edges. The angled-off section 62 can have different extensions in the direction vertically with respect to the door leaf 61.

With a cabinet door 60 an observation window 63 can be cut in the door leaf 61 in order to monitor functions in the interior of the switchgear from the outside of the switch gear cabinet.

What is claimed is:

1. In a kit for a switchgear cabinet with a rack with open sides that can be covered by wall elements and at least one cabinet door, the improvement comprising:

at least one of differently sized cabinet doors (60) and differently sized wall elements (30, 40) interchangeably attachable to the rack and having different installation depths extending in a direction vertically relative to the respective sides of the rack.

2. In the kit in accordance with claim 1, wherein at least one of the wall elements (40) has a bulge facing away from a switchgear cabinet interior, which is designed as a cable receptacle and to which cables (54) are conducted via cable conduits (40.1) of the wall element (40), and the cable conduits (40.1) are cut into the wall element (40) in an area assigned to at least one of a bottom and a top of the switchgear cabinet.

3. In the kit in accordance with claim 2, wherein the cable conduits (40.1) of the wall element (40) are closed by one of removable inserts (40.2) and covers (44).

4. In the kit in accordance with claim 3, wherein the wall elements (40) are suspended from a pivot bearing with a horizontal pivot axis, the wall elements (40) are pivoted into an upright mounting position, and in the upright mounting position the wall elements (40) are fixed in place on the rack by at least one fastening element (35).

5. In the kit in accordance with claim 4, wherein the wall elements (40) have a flat wall (41) with angled-off sections (42) on vertical edges, and the angled-off sections (42) have different lengths in the direction vertically relative to the respective sides of the rack.

6. In the kit in accordance with claim 5, wherein the rack has four vertical profiled frame sections (20) forming the sides of the rack, and the wall elements (40) respectively rest with the angled-off sections (42) against sides of two adjoining vertical profiled frame sections (20) of the rack facing each other.

7. In the kit in accordance with claim 6, wherein each of the cabinet doors (60) has a flat door leaf (61) with a circumferential angled-off section (62) on edges of the cabinet door (60), and the angled-off section (62) defines different structural depths.

8. In the kit in accordance with claim 7, wherein an observation window (63) is enclosed in the door leaf (61) of the cabinet door (60).

9. In the kit in accordance with claim 1, wherein the wall elements (40) are suspended from a pivot bearing with a horizontal pivot axis, the wall elements (40) are pivoted into an upright mounting position, and in the upright mounting position the wall elements (40) are fixed in place on the rack by at least one fastening element (35).

10. In the kit in accordance with claim 1, wherein the wall elements (40) have a flat wall (41) with angled-off sections (42) on vertical edges, and the angled-off sections (42) have different lengths in the direction vertically relative to the respective sides of the rack.

11. In the kit in accordance with claim 10, wherein the rack has four vertical profiled frame sections (20) forming the sides of the rack, and the wall elements (40) respectively rest with the angled-off sections (42) against sides of two adjoining vertical profiled frame sections (20) of the rack facing each other.

12. In the kit in accordance with claim 1, wherein each of the cabinet doors (60) has a flat door leaf (61) with a circumferential angled-off section (62) on edges of the cabinet door (60), and the angled-off section (62) defines different structural depths.

13. In the kit in accordance with claim 1, wherein an observation window (63) is enclosed in a door leaf (61) the cabinet door (60).

* * * * *